US012542988B2

(12) United States Patent
Yang et al.

(10) Patent No.: US 12,542,988 B2
(45) Date of Patent: Feb. 3, 2026

(54) ELECTRONIC DEVICE COMPRISING SPEAKER MODULE

(71) Applicant: SAMSUNG ELECTRONICS CO., LTD., Suwon-si (KR)

(72) Inventors: Seongkwan Yang, Suwon-si (KR); Kiwon Kim, Suwon-si (KR); Byounghee Lee, Suwon-si (KR); Joonrae Cho, Suwon-si (KR); Youngbae Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 193 days.

(21) Appl. No.: 18/377,631

(22) Filed: Oct. 6, 2023

(65) Prior Publication Data

US 2024/0040290 A1 Feb. 1, 2024

Related U.S. Application Data

(63) Continuation of application No. PCT/KR2022/003820, filed on Mar. 18, 2022.

(30) Foreign Application Priority Data

Apr. 6, 2021 (KR) ........................ 10-2021-0044613

(51) Int. Cl.
*H04R 1/02* (2006.01)
*G10K 11/162* (2006.01)
(Continued)

(52) U.S. Cl.
CPC ........... *H04R 1/025* (2013.01); *G10K 11/162* (2013.01); *H04R 1/023* (2013.01); *H04R 1/028* (2013.01);
(Continued)

(58) Field of Classification Search
CPC ........ H04R 1/023; H04R 1/025; H04R 1/028; H04R 1/2803; H04R 1/2811; H04R 1/288; H04R 9/06; H04R 31/00; H04R 2499/11
See application file for complete search history.

(56) References Cited

U.S. PATENT DOCUMENTS 8,358,799 B1 1/2013 Gresko et al.
9,838,765 B1 * 12/2017 Li .......................... H04R 1/023
(Continued)

FOREIGN PATENT DOCUMENTS

CN 104811831 A 7/2015
CN 106162459 A 11/2016
(Continued)

OTHER PUBLICATIONS

Communication dated Mar. 21, 2025, issued by Korean Patent Office in Korean Patent Application No. 10-2021-0044613.
(Continued)

*Primary Examiner* — Huyen D Le
(74) *Attorney, Agent, or Firm* — Sughrue Mion, PLLC

(57) ABSTRACT

According to one or more embodiments of the present disclosure, an electronic device may comprise: a housing; a resonance space which is disposed in the housing and in which a sound-absorbing material is accommodated; and a speaker module which is disposed in the housing and includes an acoustic filter opposite to at least a part of the resonance space, wherein the acoustic filter comprises a first plate including a first through-pattern and a second plate including a second through-pattern opposite to a part of the first through-pattern.

16 Claims, 12 Drawing Sheets

(51) Int. Cl.
*H04R 1/28* (2006.01)
*H04R 9/06* (2006.01)
*H04R 31/00* (2006.01)

(52) U.S. Cl.
CPC ........... *H04R 1/2811* (2013.01); *H04R 1/288* (2013.01); *H04R 9/06* (2013.01); *H04R 31/00* (2013.01); *H04R 2499/11* (2013.01)

(56) References Cited

U.S. PATENT DOCUMENTS

| | | | |
|---|---|---|---|
| 10,484,769 | B2 * | 11/2019 | Zhang .................... H04R 1/025 |
| 2015/0158722 | A1 | 6/2015 | Lim et al. |
| 2016/0157367 | A1 | 6/2016 | Andre et al. |
| 2017/0041703 | A1 | 2/2017 | Herold et al. |
| 2017/0051769 | A1 | 2/2017 | Hilario et al. |
| 2017/0195781 | A1 * | 7/2017 | Kang ................. B01J 20/28004 |
| 2018/0132020 | A1 | 5/2018 | Seo et al. |
| 2018/0132035 | A1 | 5/2018 | Cao |
| 2019/0253789 | A1 | 8/2019 | Cao et al. |
| 2020/0060029 | A1 | 2/2020 | Andre et al. |
| 2020/0092636 | A1 | 3/2020 | Sauer et al. |
| 2020/0196046 | A1 | 6/2020 | Park et al. |
| 2020/0196051 | A1 | 6/2020 | Kim et al. |

FOREIGN PATENT DOCUMENTS

| | | | |
|---|---|---|---|
| CN | 109275063 | A | 1/2019 |
| CN | 110198513 | A | 9/2019 |
| CN | 111698585 | A | 9/2020 |
| EP | 0565369 | A2 | 10/1993 |
| JP | 6-54392 | A | 2/1994 |
| KR | 10-2013-0129106 | A | 11/2013 |
| KR | 10-1514567 | B1 | 4/2015 |
| KR | 10-2018-0052291 | A | 5/2018 |
| KR | 10-2020-0072056 | A | 6/2020 |
| KR | 10-2020-0074554 | A | 6/2020 |

OTHER PUBLICATIONS

Extended European Search Report dated Sep. 2, 2024, issued by the European Patent Office in European Application No. 22784804.1.
International Search Report (PCT/ISA/210) issued by the International Searching Authority on Jun. 28, 2022 in corresponding International Application No. PCT/KR2022/003820.
Written Opinion (PCT/ISA/237) issued by the International Searching Authority on Jun. 28, 2022 in corresponding International Application No. PCT/KR2022/003820.

* cited by examiner

ELECTRONIC DEVICE COMPRISING SPEAKER MODULE

CROSS-REFERENCE TO RELATED APPLICATIONS

This application is a by-pass continuation of International Application No. PCT/KR2022/003820, filed on Mar. 18, 2022, which is based on and claims priority to Korean Patent Application No. 10-2021-0044613, filed on Apr. 6, 2021, in the Korean Intellectual Property Office, the disclosures of which are incorporated by reference herein in their entireties.

BACKGROUND

1. Field

The disclosure relates to an electronic device including a speaker module.

2. Description of Related Art

The development of information and communication technology and semiconductor technology has led to the integration of various functions into a single portable electronic device. An electronic device may output stored information as sound or an image. As the integration level of electronic devices increases and high-speed, high-capacity wireless communication becomes common, a single electronic device such as a mobile communication terminal may be equipped with a variety of functions. For example, an entertainment function such as games, a multimedia function such as music and video playback, a communication and security function for mobile banking, or various functions such as schedule management or an electronic wallet, as well as a communication function, are being integrated into one electronic device. These electronic devices are being miniaturized so that users may conveniently carry them.

An electronic device may improve the performance of a speaker by utilizing a resonance space in which sound generated by the speaker may resonate. For example, the electronic device may provide sound to a user using the speaker module including the resonance space and an acoustic filter facing the resonance space. However, when holes are formed in the acoustic filter by a press process, the sizes of the holes in the acoustic filter may be larger than that of a sound absorbing material located within the resonance space, and the sound absorbing material may be introduced into the speaker module, resulting in degradation of the speaker performance. When the holes are formed in the acoustic filter by a laser so that their sizes are smaller than that of the sound absorbing material, the manufacturing cost and time of the electronic device may increase.

SUMMARY

According to one or more embodiments of the disclosure, an electronic device may be provided, which is capable of adjusting acoustic impedance using an acoustic filter including a plurality of through patterns formed by a press process.

According to one or more embodiments of the disclosure, an electronic device may be provided, which includes an acoustic filter capable of reducing or preventing the introduction of a sound absorbing material into a speaker module.

The disclosure is not limited to the foregoing, and may be expanded in various ways without departing from the spirit and scope of the disclosure.

According to an aspect of the disclosure, an electronic device includes: a housing; a resonance space located inside the housing; a sound absorbing material disposed inside the resonance space; and a speaker module disposed inside the housing, the speaker module comprising an acoustic filter facing at least a portion of the resonance space, wherein the acoustic filter comprises: a first plate comprising a first through pattern, and a second plate comprising a second through pattern facing a portion of the first through pattern.

The first through pattern may be arranged with respect to at least one first axis, and the second through pattern may be arranged with respect to at least one second axis spaced apart from the at least one first axis.

The acoustic filter may further include an overlap region in which the first through pattern and the second through pattern overlap with each other, and a first cross-sectional area of the overlap region may be smaller than a second cross-sectional area of the first through pattern or a third cross-sectional area of the second through pattern.

A first length of the overlap region may be smaller than a second length of the sound absorbing material.

The acoustic filter may further include an adhesive member disposed between the first plate and the second plate.

The first plate may further include a first center region in which the first through pattern is located and a first periphery region surrounding the first center region, the second plate may further include a second center region in which the second through pattern is located and a second periphery region surrounding the second center region, and the adhesive member may be disposed between the first periphery region and the second periphery region.

The speaker module may further include a speaker support member configured to support the first plate or the second plate.

The first plate may further include a first protrusion region facing the second plate and connected to the speaker support member, and at least a part of the second plate may be disposed between the first plate and the speaker support member.

The first plate may further include a first surface facing at least a part of the resonance space, and a second surface opposite to the first surface, the first through pattern may include a plurality of through holes penetrating the first surface and the second surface, the second plate may further include a third surface facing the first surface and a fourth surface opposite to the third surface, and the second through pattern may include a plurality of second through holes penetrating the third surface and the fourth surface.

The speaker module may further include a diaphragm and a coil configured to vibrate the diaphragm.

The housing may include a speaker hole configured to transmit sound generated by the speaker module to an outside of the electronic device, and the speaker hole and the acoustic filter may be located in different directions relative to the diaphragm.

The first plate and the second plate may further include at least one of aluminum, stainless steel, and copper.

The first through pattern and the second through pattern may be formed using press processing.

The sound absorbing material may include a plurality of particles solidified into a synthetic resin.

A shape of the first through pattern may be different from a shape of the second through pattern.

An electronic device according to one or more embodiments of the disclosure may improve acoustic quality by adjusting acoustic impedance using an acoustic filter including a through pattern and a resonance space facing the acoustic filter.

The acoustic filter according to one or more embodiments of the disclosure may include a plurality of metal plates formed using a press process. As the acoustic filter is formed using the press process, the production cost and time of the electronic device may be reduced. Formation of the acoustic filter of a metal may lead to an increase in the durability of a speaker module and the mounting space of the electronic device.

The acoustic filter according to one or more embodiments of the disclosure may include a plurality of through patterns partially overlapping with each other. Because the through patterns overlap with each other, the introduction of a sound absorbing material smaller in size than each of the through patterns into the speaker module may be reduced or prevented.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
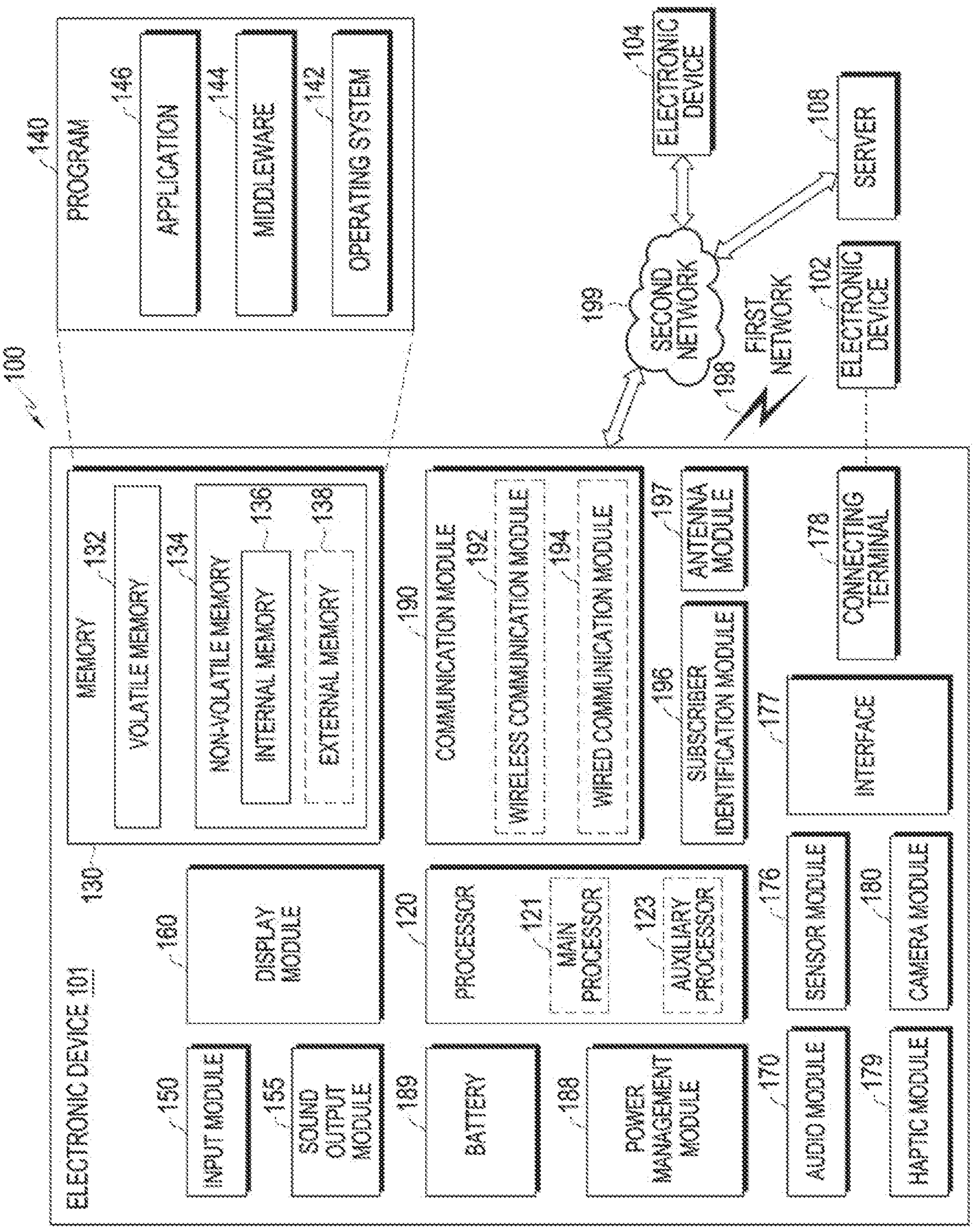
FIG. 1 is a block diagram illustrating an electronic device in a network environment according to one or more embodiments of the disclosure.

FIG. 1 is a block diagram illustrating an electronic device in a network environment according to one or more embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In a certain embodiment, at least one of the components (e.g., the connecting terminal 178) may be omitted from the electronic device 101, or one or more other components may be added in the electronic device 101. In a certain embodiment, some of the components (e.g., the sensor module 176, the camera module 180, or the antenna module 197) may be implemented as a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a specified high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the specified high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in the disclosure, the term “module” may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
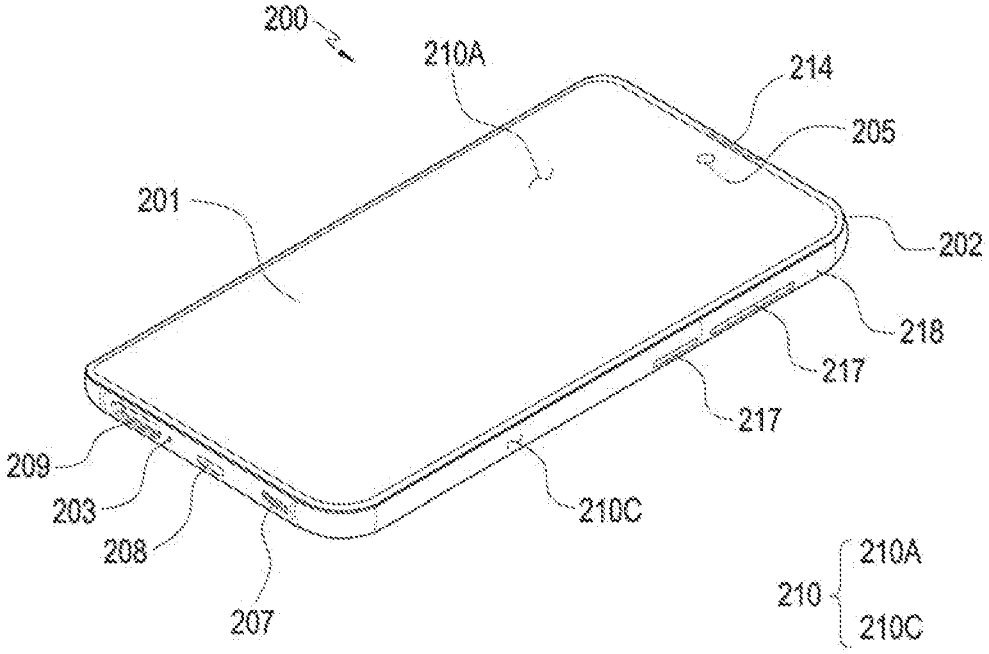
FIG. 2 is a front perspective view illustrating an electronic device according to one or more embodiments of the disclosure.
Figure 3:
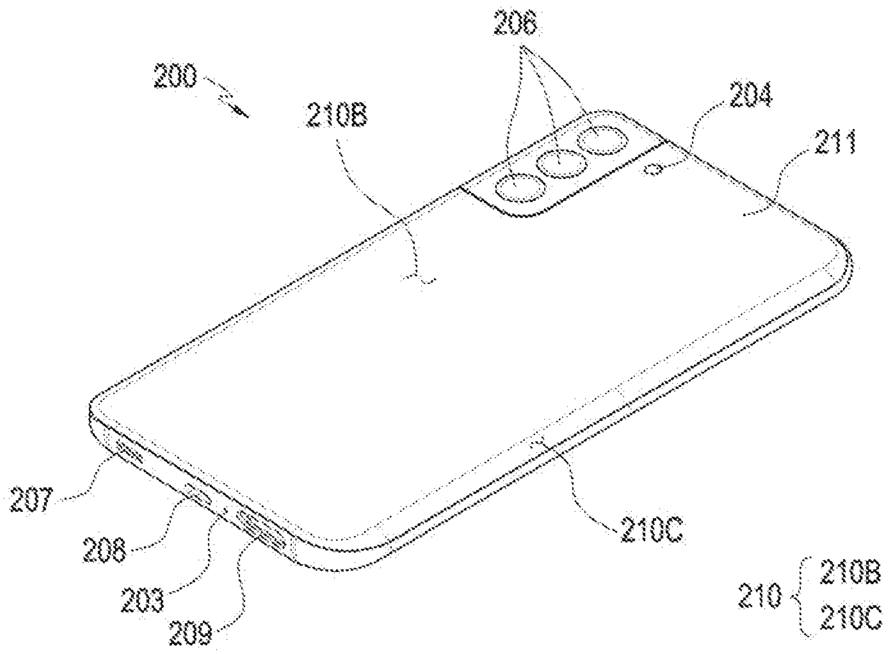
FIG. 3 is a rear perspective view illustrating an electronic device according to one or more embodiments of the disclosure.

FIG. 2 is a front perspective view illustrating an electronic device according to one or more embodiments of the disclosure. FIG. 3 is a rear perspective view illustrating an electronic device according to one or more embodiments of the disclosure.

Referring to FIGS. 2 and 3, an electronic device 200 according to an embodiment may include a housing 210 which includes a front surface 210A, a rear surface 210B, and a side surface 210C surrounding a space between the front surface 210A and the rear surface 210B. In another embodiment, the housing 210 may refer to a structure that forms a part of the front surface 210A of FIG. 2, the rear surface 210B of FIG. 3, and the side surface 210C. According to an embodiment, at least a part of the front surface 210A may be formed by a front plate 202 (e.g., a glass plate or polymer plate including various coating layers) which is at least partially substantially transparent. The rear surface 210B may be formed by a rear plate 211. The rear plate 211 may be formed of, for example, glass, ceramic, a polymer, a metal (e.g., titanium (Ti), stainless steel (STS), or magnesium (Mg)), or a combination of at least two of these materials. The side surface 210C may be coupled with the front plate 202 and the rear plate 211 and formed by a side bezel structure (or “side member”) 218 including a metal and/or a polymer. In a certain embodiment, the rear plate 211 and the side bezel structure 218 may be integrally formed and include the same material (e.g., glass, a metallic material such as aluminum, or ceramic). In another embodiment, the front surface 210A and/or the front plate 202 may be interpreted as a part of a display 201.

According to an embodiment, the electronic device 200 may include at least one of the display 201, audio modules 203, 207, and 214 (e.g., the audio module 170 of FIG. 1), a sensor module (e.g., the sensor module 176 of FIG. 1), camera modules 205 and 206 (e.g., the camera module 180 of FIG. 1), key input devices 217 (e.g., the input module 150 of FIG. 1), or connector holes 208 and 209 (e.g., the connecting terminal 178 of FIG. 1). In a certain embodiment, the electronic device 101 may not be provided with at least one (e.g., the connector hole 209) of the components or additionally include other components.

According to an embodiment, the display 201 may be visually exposed, for example, through a substantial portion of the front plate 202. According to an embodiment, a surface (or the front plate 202) of the housing 210 may include a view area formed by visual exposure of the display 201. For example, the view area may include the front surface 210A.

In another embodiment, the electronic device 101 may include a recess or an opening formed in a part of the view area (e.g., the front surface 210A) of the display 201, and include at least one of the audio module 214, a sensor module, a light emitting element, or the camera module 205, which is aligned with the recess or the opening. In another embodiment, the electronic device 101 may include at least one of the audio module 214, the sensor module, the camera module 205, a fingerprint sensor, or the light emitting element on the rear surface of the view area of the display 201.

In another embodiment, the display 201 may be incorporated with or disposed adjacent to a touch sensing circuit, a pressure sensor that measures the intensity (pressure) of a touch, and/or a digitizer that detects a magnetic field-based stylus pen.

In a certain embodiment, at least some of the key input devices 217 may be disposed in the side bezel structure 218.

According to an embodiment, the audio modules 203, 207, and 214 may include, for example, a microphone hole 203 and speaker holes 207 and 214. A microphone for obtaining an external sound may be disposed in the microphone hole 203, and in a certain embodiment, a plurality of microphones may be disposed to detect the direction of a sound. The speaker holes 207 and 214 may include an external speaker hole 207 and a receiver hole 214 for calls. In a certain embodiment, the speaker holes 207 and 214 and the microphone hole 203 may be implemented as a single hole, or a speaker (e.g., a piezo speaker) may be included without the speaker holes 207 and 214.

According to an embodiment, the sensor module may detect an internal operation state or external environmental state of the electronic device 101 and generate an electrical signal or data value corresponding to the detected state. The sensor module may include, for example, a first sensor module (e.g., a proximity sensor) and/or a second sensor module (e.g., a fingerprint sensor), disposed on the front surface 210*a*. The sensor module may include, for example, a third sensor module (e.g., a hear rate monitor (HRM) sensor) and/or a fourth sensor module (e.g., a fingerprint sensor), disposed on the rear surface 210B. In a certain embodiment, the fingerprint sensor may be disposed on the rear surface 210*b* as well as on the front surface 210*a* (e.g., the display 201). The electronic device 101 may further include a sensor module, for example, at least one of a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

According to an embodiment, the camera modules 205 and 206 may include, for example, a front camera module 205 disposed on the front surface 210A of the electronic device 101, and a rear camera module 206 and/or a flash 204 disposed on the rear surface 210B of the electronic device 101. Each of the camera modules 205 and 206 may include one or more lenses, an image sensor, and/or an image signal processor. The flash 204 may include, for example, a light emitting diode (LED) or a xenon lamp. In a certain embodiment, two or more lenses (an IR camera, a wide-angle lens, and a telephoto lens) and image sensors may be arranged on one surface of the electronic device 101.

According to an embodiment, the key input devices 217 may be arranged on the side surface 210C of the housing 210. In another embodiment, the electronic device 101 may not include some or any of the above key input devices 217, and the key input devices 217 which are not included may be implemented in other forms such as soft keys on the display 201.

According to an embodiment, the light emitting element may be disposed, for example, on the front surface 210A of the housing 210. The light emitting element may provide, for example, state information about the electronic device 101 in the form of light. In another embodiment, the light emitting element may provide, for example, a light source interworking with an operation of the front camera module 205. The light emitting element may include, for example, an LED, an IR LED, and/or a xenon lamp.

According to an embodiment, the connector holes 208 and 209 may include a first connector hole 208 that may accommodate a connector (e.g., a universal serial bus (USB) connector) for transmitting and receiving power and/or data to and from an external electronic device and a connector (e.g., an earphone jack) for transmitting and receiving an audio signal to and from an external electronic device, and/or a second connector hole 209 for accommodating a storage device (e.g., a subscriber identity module (SIM) card). According to an embodiment, the first connector hole 208 and/or the second connector hole 209 may be omitted.

Figure 4:
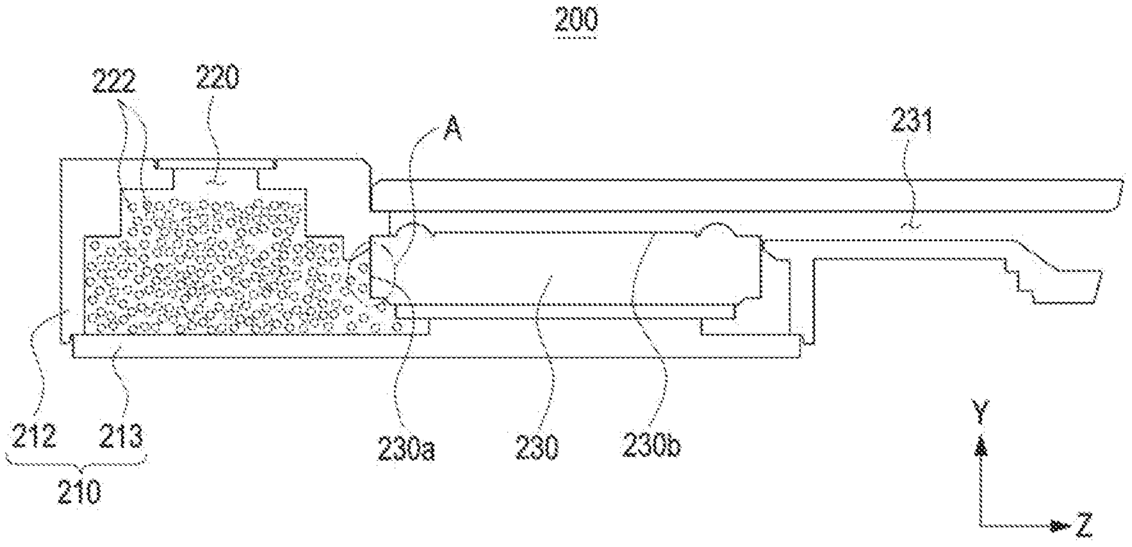
FIG. 4 is a cross-sectional view illustrating an electronic device including a resonance space and a speaker module according to one or more embodiments of the disclosure.
Figure 5:
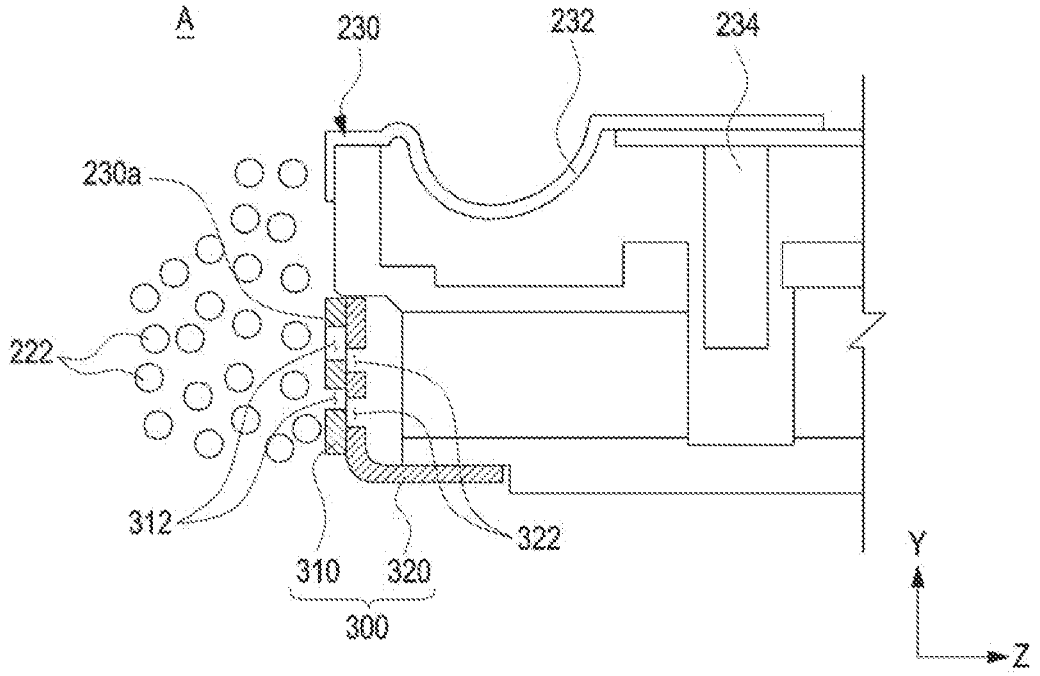
FIG. 5 is an enlarged view illustrating an area A of FIG. 4.
Figure 6:
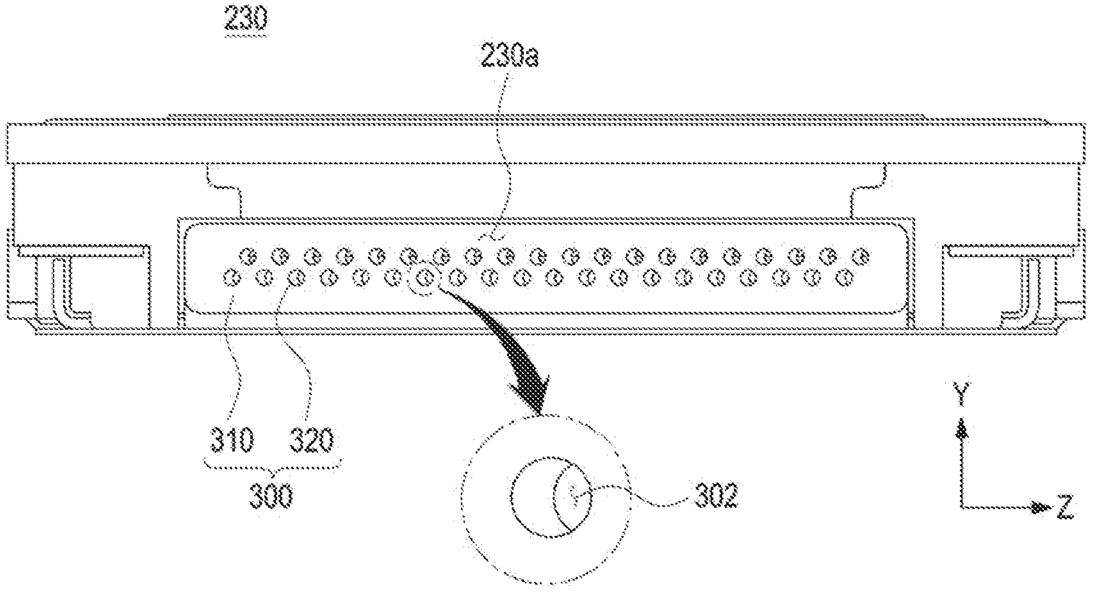
FIG. 6 is a front view illustrating a speaker module according to one or more embodiments of the disclosure.

FIG. 4 is a cross-sectional view illustrating an electronic device including a resonance space and a speaker module according to one or more embodiments of the disclosure. FIG. 5 is an enlarged view illustrating an area A of FIG. 4. FIG. 6 is a front view illustrating a speaker module according to one or more embodiments of the disclosure.

Referring to FIGS. 4 to 6, the electronic device 200 may include the housing 210, a resonance space 220, and a speaker module 230. The configuration of the housing 210 in FIGS. 4 to 6 may be wholly or partially the same as that of the housing 210 in FIGS. 2 and 3, and the configuration of the speaker module 230 in FIGS. 4 to 6 may be wholly or partially the same as that of the sound output module 155 and/or the audio module 170 in FIG. 1.

According to one or more embodiments, the housing 210 may support components of the electronic device 200. For example, the housing 210 may include at least one support member (e.g., a first support member 212 and/or a second support member 213) to support a component (e.g., the battery 189 of FIG. 1) of the electronic device 200. According to an embodiment, the support members 212 and 213 may be connected to or coupled with the speaker module 230.

According to one or more embodiments, the resonance space 220 may be located within the housing 210. For example, the resonance space 220 may be interpreted as an empty space located inside a front surface (e.g., the front surface 210A of FIG. 2), a rear surface (e.g., the rear surface 210B of FIG. 3), and/or a side surface (e.g., the side surface 210C of FIG. 3). According to an embodiment, the housing 210 may form the resonance space 220. For example, the resonance space 220 may be surrounded by the first support member 212 and the second support member 213 which are connected to the speaker module 230. According to an embodiment, the resonance space 220 may be surrounded by the first support member 212, the second support member 213, and a part (e.g., a first speaker module surface 230*a*) of the speaker module 230.

According to one or more embodiments, the resonance space 220 may adjust the output of the speaker module 230. For example, at least a part of vibration generated by the speaker module 230 may resonate in the resonance space 220. According to an embodiment, the performance of the speaker module 230 in a bass band (e.g., a 200 to 800 Hz band) may be improved based on the size (e.g., volume) of the resonance space 220. For example, the loudness of sound in the bass band may be increased based on the size of the resonance space 220.

According to one or more embodiments, the resonance space 220 may accommodate a sound absorbing material or backing material 222. The sound absorbing material 222 may absorb at least a part of sound or vibration generated by the speaker module 230. According to an embodiment, the sound absorbing material 222 may include a synthetic resin (e.g., polyester and/or polyurethane). For example, the sound absorbing material 222 may include a plurality of particles into which a synthetic resin is solidified, and may be interpreted as sound absorbing particles.

According to one or more embodiments, the speaker module 230 may convert an electrical signal into sound. For example, the speaker module 230 may include at least one of a diaphragm (e.g., diaphragm) 232, a coil (e.g., voice coil) 234 formed of a conductive material and configured to vibrate the diaphragm 232 based on pulse width modulation (PWM), a damping member (e.g., spring) to transmit a signal (e.g., power) received from the outside of the speaker module 230 to the coil 234, a magnet, or a conductive plate to concentrate a magnetic field generated by the magnet.

According to one or more embodiments, the speaker module 230 may transmit vibration and/or sound to the outside of the electronic device 200 through an acoustic path 231 to deliver sound to a speaker hole (e.g., the speaker hole 207 of FIG. 2). For example, vibration and/or sound generated by the diaphragm 232 of the speaker module 230 may be transmitted to the speaker hole (e.g., the speaker hole 207 of FIG. 2) and/or the outside of the electronic device 200 through the acoustic path 231.

According to one or more embodiments, the speaker module 230 may include an acoustic filter 300. According to an embodiment, the acoustic filter 300 may face at least a part of the resonance space 220. For example, at least a part of the vibration or sound generated by the speaker module 230 may be transmitted to the resonance space 220 through the acoustic filter 300. According to an embodiment, the speaker module 230 may include the first speaker module surface 230*a* facing the resonance space 220. The acoustic filter 300 may form at least a part of the first speaker module surface 230*a*. According to an embodiment, the first speaker module surface 230*a* may face in a different direction from a second speaker module surface 230*b* formed by the diaphragm 232. According to an embodiment, the speaker hole (e.g., the speaker hole 207 of FIG. 3) and the acoustic filter 300 may be located in different directions relative to the diaphragm 232. For example, the acoustic filter 300 may be interpreted as a rear filter of the speaker module 230.

According to one or more embodiments, the acoustic filter 300 may include a plurality of plates 310 and 320 having through patterns 312 and 322 formed thereon. For example, the acoustic filter 300 may include a first plate 310 including a first through pattern 312 and a second plate 320 including a second through pattern 322. According to an embodiment, the first through pattern 312 and the second through pattern 322 may be interpreted as through holes. According to an embodiment, the first through pattern 312 and/or the second through pattern 322 may each be a plurality of substantially parallel through holes. According to another embodiment, the acoustic filter 300 may include three or more plates. For example, the acoustic filter 300 may include a third through pattern, and include a third plate disposed on the first plate 310 and/or the second plate 320.

Figure 8A:
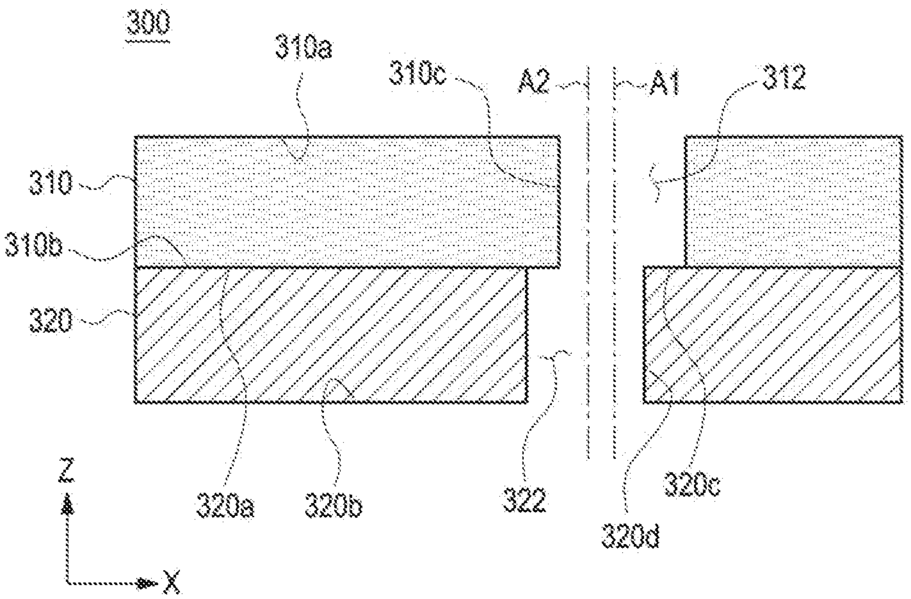
FIGS. 8A, 8B, 8C, and 8D are cross-sectional views illustrating acoustic filters according to one or more embodiments of the disclosure.
Figure 8B:
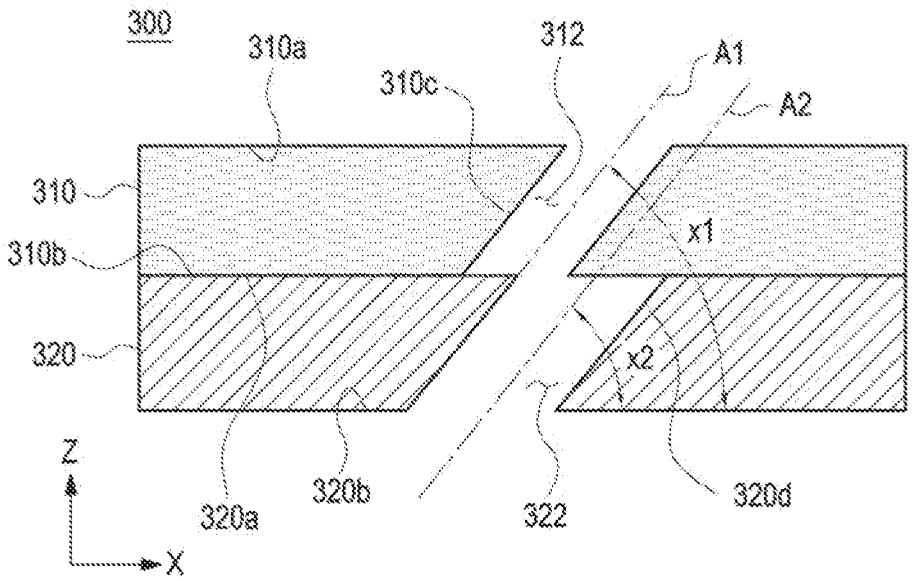
Figure 8C:
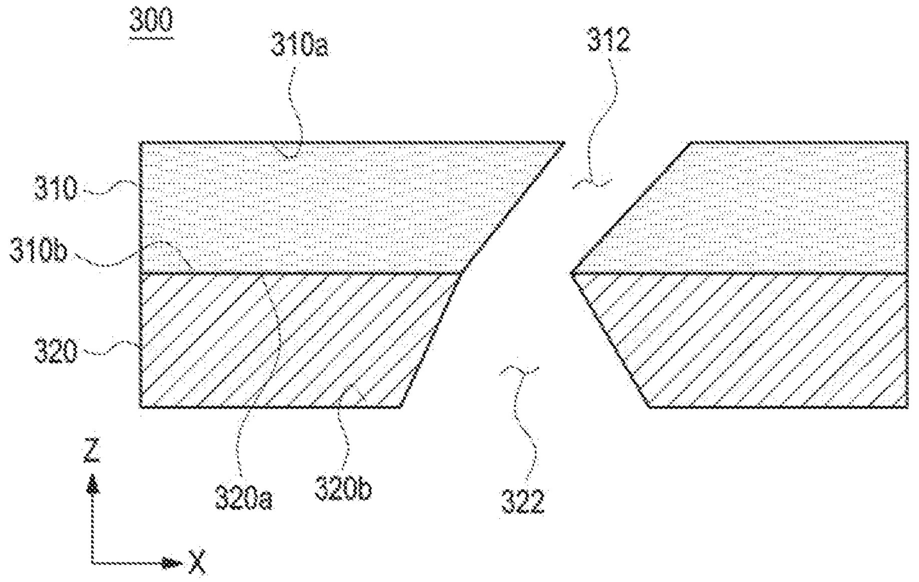
Figure 8D:
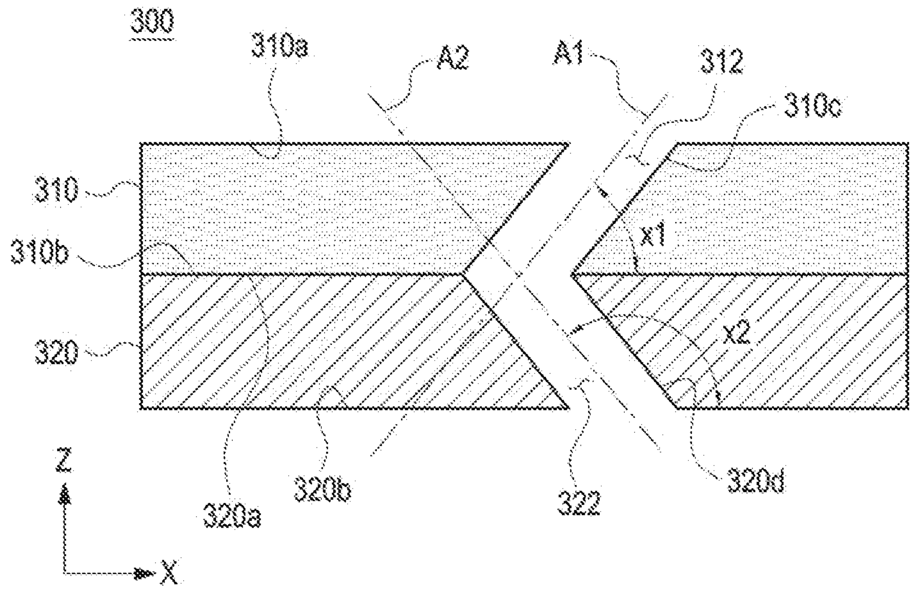

According to one or more embodiments, the acoustic filter 300 may reduce or prevent the introduction of a material (e.g., the sound absorbing material 222) external to the speaker module 230 into the speaker module 230. According to an embodiment, the first through pattern 312 and the second through pattern 322 may be misaligned. According to an embodiment, the acoustic filter 300 may include an overlap region 302 in which the first through pattern 312 and the second through pattern 322 overlap with each other. For example, when the acoustic filter 300 is viewed from above (e.g., in a Z-axis direction), a part of the first through pattern 312 may overlap or intersect with a part of the second through pattern 322, and a region in which the first through pattern 312 and the second through pattern 322 overlap or intersect may be interpreted as the overlap region 302. According to an embodiment, a part (e.g., the second through pattern 322) of the second plate 320 may face a part of the first through pattern 312, and another part (e.g., a fifth surface 320*c* of FIG. 8A) of the second plate 320 may face another part of the first through pattern 312. For example, the fifth surface 320*c* may be visually exposed to the outside of the speaker module 230 and/or the acoustic filter 300.

According to an embodiment, because the acoustic filter 300 prevents a foreign material from entering the speaker module 230, a mesh member including a plurality of through holes may be omitted. A mounting space in the electronic device (e.g., the electronic device 200 of FIG. 2) may be increased by omitting the mesh member and an adhesive member (e.g., adhesive tape) to attach the mesh member to the speaker module 230.

According to one or more embodiments, the output of the speaker module 230 may be adjusted based on the acoustic filter 300 and/or the resonance space 220. According to an embodiment, acoustic impedance and/or a quality factor (Q factor) of the speaker module 230 may be adjusted based on the size (e.g., width or volume) of the first through pattern 312 and/or the size (e.g., width or volume) of the second through pattern 322. According to an embodiment, the acoustic impedance and/or Q factor of the speaker module 230 may be adjusted based on the volume of the resonance space 220. According to an embodiment, the through patterns 312 and 322 of the acoustic filter 300 may be interpreted as an air vent.

According to one or more embodiments, the plates 310 and 320 may include a metal. For example, the first plate 310 and the second plate 320 may include at least one of aluminum, stainless steel, or copper. According to an embodiment, the rigidity of an acoustic filter formed of a resin may be less than that of the acoustic filter 300 formed of a metal. For example, when the acoustic filter formed of the resin is used, the thickness of the acoustic filter may be increased and the mounting space in the electronic device may be reduced, to achieve substantially the same rigidity as that of the acoustic filter 300 according to one or more embodiments of the disclosure.

According to one or more embodiments, the first plate 310 and/or the second plate 320 may be formed using a mold. For example, the first through pattern 312 and/or the second through pattern 322 may be formed using a press process. For example, the first through pattern 312 may be a plurality of through holes formed on the first plate 310 by piercing or punching, and the second through pattern 322 may be a plurality of through holes formed on the second plate 320 by piercing or punching. According to another embodiment, the first through pattern 312 and/or the second through pattern 322 may be formed using a laser. According to an embodiment, a processing time to form the through patterns 312 and 322 on the plates 310 and 320 using press processing may be shorter than a processing time to form the through patterns 312 and 322 on the plates 310 and 320 using laser processing.

Figure 7A:
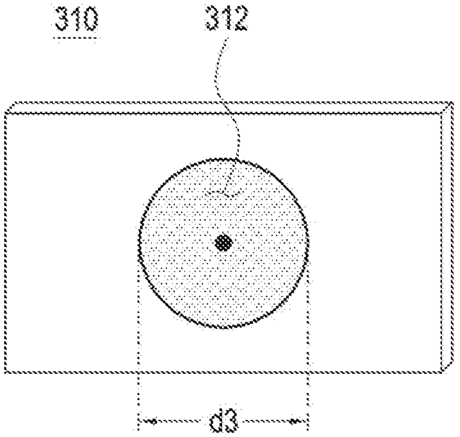
FIGS. 7A, 7B, 7C, and 7D are diagrams illustrating a relationship between an acoustic filter and a sound absorbing material according to one or more embodiments of the disclosure.
Figure 7B:
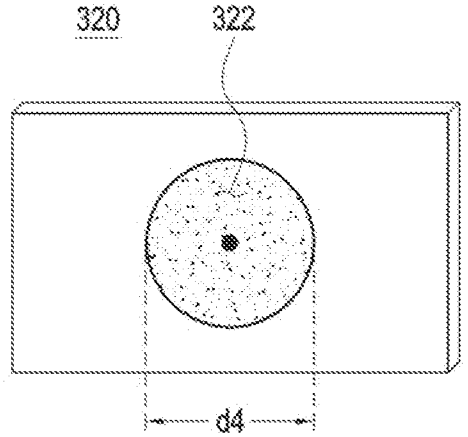
Figure 7C:
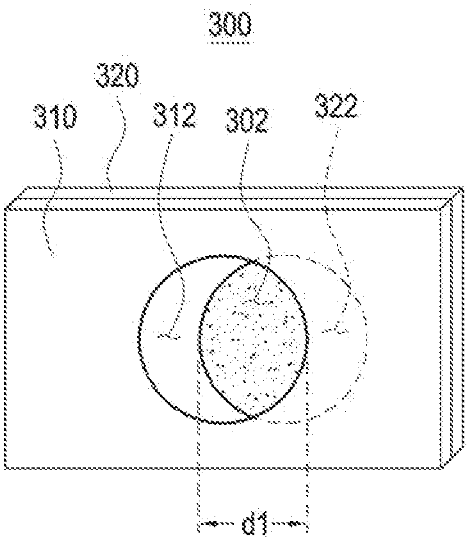
Figure 7D:
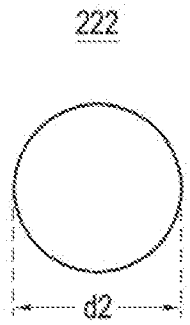

FIGS. 7A, 7B, 7C, and 7D are diagrams illustrating a relationship between an acoustic filter and a sound absorbing material according to one or more embodiments of the disclosure. For example, FIG. 7A is a diagram illustrating a first plate, FIG. 7B is a diagram illustrating a second plate, FIG. 7C is a diagram illustrating an acoustic filter, and FIG. 7D is a diagram illustrating a sound absorbing material.

Referring to FIGS. 7A, 7B, 7C, and 7D, the acoustic filter 300 may reduce or prevent the introduction of the sound absorbing material 222. The configurations of the first plate 310, the second plate 320, and the sound absorbing material 222 in FIGS. 7A, 7B, 7C, and 7D may be wholly or partially the same as those of the first plate 310, the second plate 320, and the sound absorbing material 222 in FIG. 5.

According to one or more embodiments, the acoustic filter 300 may include the overlap region 302 to prevent or reduce migration of the sound absorbing material 222. According to an embodiment, a first length d1 (e.g., width) of the overlap region 302 may be smaller than a second length d2 (e.g., width or diameter) of the sound absorbing material 222.

According to one or more embodiments, the overlap region 302 may be a region where a part of the first through pattern 312 and a part of the second through pattern 322 overlap with each other. According to an embodiment, the first plate 310 and/or the second plate 320 formed by press processing may include more than a specified size of the first through pattern 312 and/or the second through pattern 322 due to the structure of the mold. The overlap region 302 may be formed in a size smaller than that of a through pattern (e.g., the first through pattern 312 and/or the second through pattern 322) that may be formed by press processing. For example, the size of a first cross-sectional area of the overlap region 302 may be smaller than the size of a second cross-sectional area of the first through pattern 312 or a third size of the second through pattern 322. The first length d1 of the overlap region 302 may be smaller than a third length d3 (e.g., width or diameter) of the first through pattern 312 and/or a fourth length d4 (e.g., width or diameter) of the second through pattern 322.

FIGS. 8A, 8B, 8C, and 8D are cross-sectional views illustrating acoustic filters according to one or more embodiments of the disclosure.

Referring to FIGS. 8A, 8B, 8C, and 8D, the first through pattern 312 and/or the second through pattern 322 of the acoustic filter 300 may be formed in various shapes. The configurations of the acoustic filter 300 in FIGS. 8A, 8B, 8C, and 8D may be wholly or partially the same as that of the acoustic filter 300 in FIG. 5.

According to one or more embodiments, the acoustic filter 300 may include the first through pattern 312 arranged with respect to at least one first axis A1 and the second through pattern 322 arranged with respect to at least one second axis A2.

According to an embodiment, the first through pattern 312 may be a through hole formed with respect to the first axis A1. For example, the first plate 310 may include a first surface 310*a* facing the outside of the acoustic filter 300 and a second surface 310*b* opposite to the first surface 310*a*, and the first through pattern 312 may be a through hole between the first surface 310*a* and the second surface 310*b*. The first plate 310 may include a first inner surface 310*c* surrounding the first through pattern 312. According to an embodiment (e.g., FIG. 8A), the first axis A1 may be an imaginary axis substantially perpendicular to the first surface 310*a* or the second surface 310*b*. For example, the first inner surface 310*c* may be substantially perpendicular to the first surface 310*a* or the second surface 310*b*. According to an embodiment (e.g., FIG. 8B or FIG. 8D), the first axis A1 may be inclined at a first specified angle x1 with respect to the first surface 310*a* and/or the second surface 320*b*. For example, the first inner surface 310*c* may be inclined at the first specified angle x1 with respect to the first surface 310*a* and/or the second surface 310*b*.

According to an embodiment, the second through pattern 322 may be a through hole formed with respect to the second axis A2. For example, the second plate 320 may include a third surface 320*a* facing the outside of the acoustic filter 300, and a fourth surface 320*b* opposite to the third surface 320*a*, and the second through pattern 322 may be a through hole between the third surface 320*a* and the fourth surface 320*b*. The second plate 320 may include a second inner surface 320*d* surrounding the second through pattern 322. According to an embodiment (e.g., FIG. 8A), the second axis A2 may be an imaginary axis substantially perpendicular to the third surface 320*a* or the fourth surface 320*b*. For example, the second inner surface 320*d* may be substantially perpendicular to the first surface 310*a* or the second surface 310*b*. According to an embodiment (e.g., FIG. 8*b* or FIG. 8*d*), the second axis A1 may be inclined at a second specified angle x2 with respect to the second surface 310*b* and/or the fourth surface 320*b*. For example, the second inner surface 320*d* may be inclined at the second specified angle x2 with respect to the third surface 320*a* and/or the fourth surface 320*b*.

According to one or more embodiments, the second axis A2 may be spaced apart from the first axis A2. According to an embodiment (e.g., FIG. 8A or FIG. 8B), the second axis A2 may be disposed parallel to the first axis A2. According to an embodiment (e.g., FIG. 8D), the second axis A2 may be disposed to intersect the first axis A2.

According to an embodiment (e.g., FIG. 8A or FIG. 8B), the shape of the first through pattern 312 may be substantially the same as the shape of the second through pattern 322. According to an embodiment (e.g., FIG. 8C), the shape of the first through pattern 312 may be different from the shape of the second through pattern 322. For example, the first through pattern 312 may be formed in the shape of a cylinder or a tilted cylinder, while the second through pattern 322 may be formed in the shape of a truncated cone.

Figure 9:
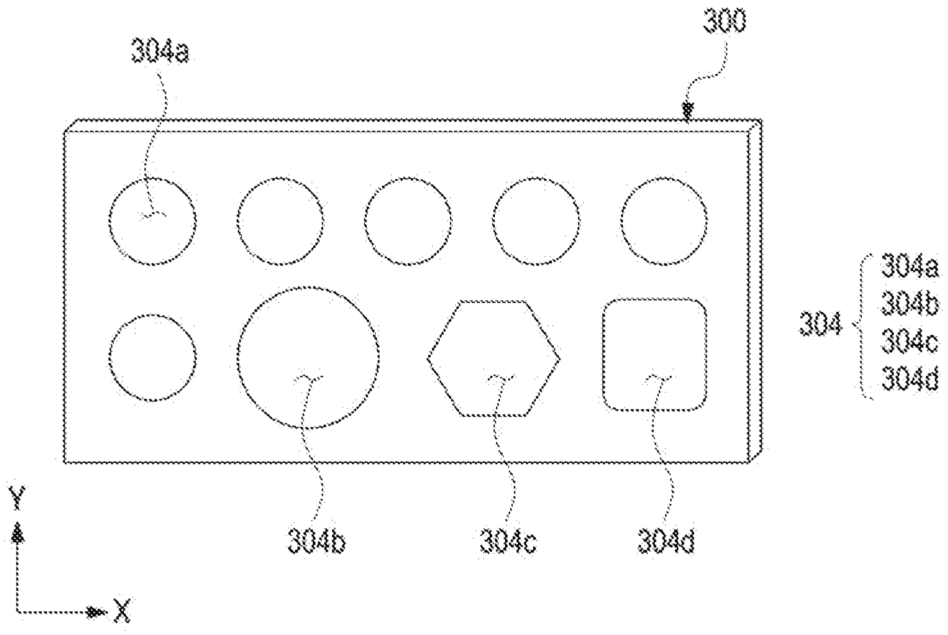
FIG. 9 is a diagram illustrating the shapes of through patterns according to one or more embodiments of the disclosure.

FIG. 9 is a diagram illustrating the shapes of through patterns according to one or more embodiments of the disclosure.

Referring to FIG. 9, the acoustic filter 300 may include a through pattern 304. The configuration of the acoustic filter 300 of FIG. 9 may be wholly or partially the same as that of the acoustic filter 300 of FIG. 5, and the configuration of the through pattern 304 of FIG. 9 may be wholly or partially the same as that of the first through pattern 312 and/or the second through pattern 322 of FIG. 5.

According to one or more embodiments, the through pattern 304 may be formed in various shapes. According to an embodiment, the size of the through pattern 304 may vary. For example, the through pattern 304 may include a third through pattern 304*a* and a fourth through pattern 304*b* larger than the third through pattern 304*a*. According to an embodiment, the shape of a cross-section of the through pattern 304 in a width direction (e.g., XY plane) may be circular and/or polygonal (e.g., triangular, square, or hexagonal). For example, the through pattern 304 may include the third through pattern 304*a* and/or the fourth through pattern 304*b* having a circular cross-section, a fifth through pattern 304*c* having a hexagonal cross-section, and/or a sixth through pattern 304*d* having a substantially square cross-section.

Figure 10A:
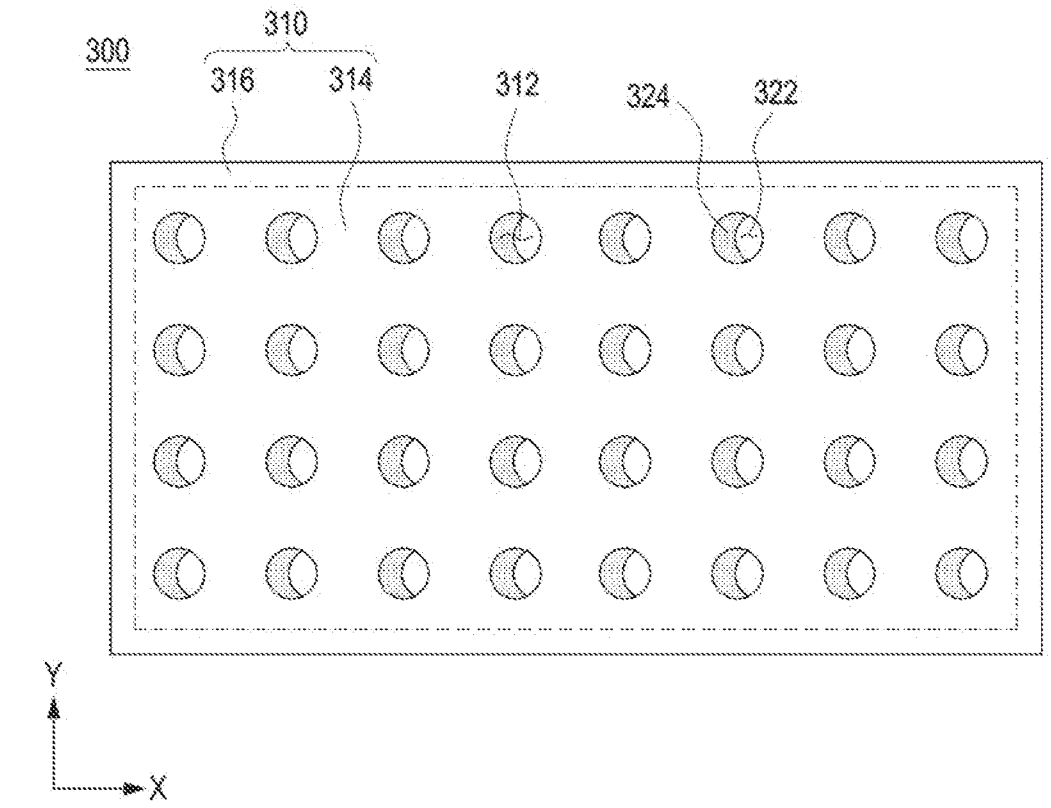
FIG. 10A is a front view illustrating an acoustic filter including an adhesive member according to one or more embodiments of the disclosure.
Figure 10B:
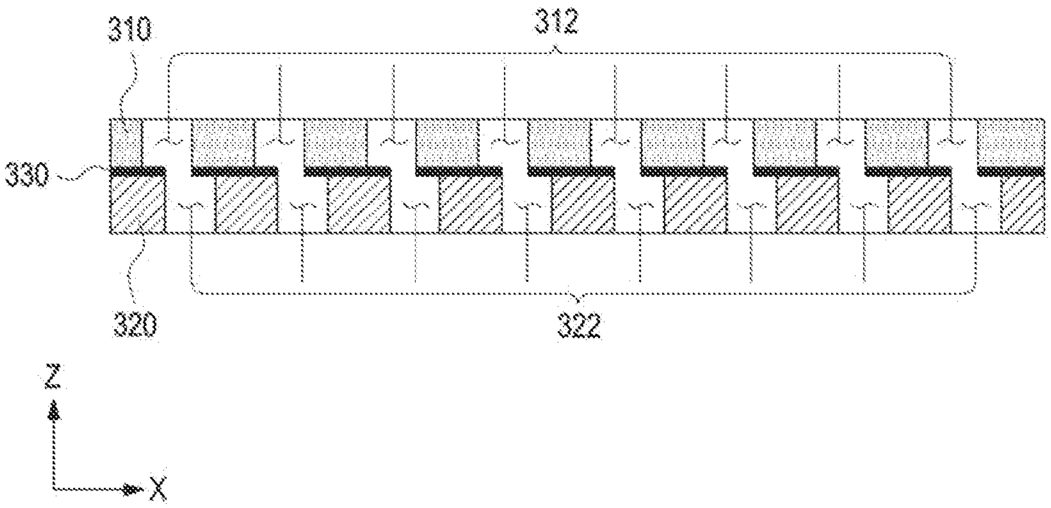
FIG. 10B is a side view illustrating the acoustic filter of FIG. 10A including the adhesive member according to one or more embodiments of the disclosure.

FIG. 10A is a front view illustrating an acoustic filter including an adhesive member according to one or more embodiments of the disclosure, and FIG. 10B is a side view illustrating an acoustic filter including an adhesive member according to one or more embodiments of the disclosure.

Referring to FIGS. 10A and 10B, the acoustic filter 300 may include an adhesive member 330 to couple the first plate 310 with the second plate 320. The configurations of the first plate 310 and the second plate 320 in FIGS. 10A and 10B may be wholly or partially the same as those of the first plate 310 and the second plate 320 in FIG. 5.

According to one or more embodiments, the adhesive member 330 may be disposed between the first plate 310 and the second plate 320. For example, the first plate 310 may include a first center region 314 in which the first through pattern 312 is located and a first periphery region 316 surrounding the first center region 314. The second plate 320 may include a second center region 324 in which the second through pattern 322 is located, and a second periphery region surrounding the second center region 324. According to an embodiment, at least a part of the adhesive member 330 may be disposed between the first plate 310 and the second plate 320, except in an overlap region (e.g., the overlap region 302 in FIG. 7C). For example, the adhesive member 330 may include a plurality of through holes facing overlap regions 302. According to an embodiment, at least a part of the adhesive member 330 may be disposed between the first center region 314 except for the first through hole pattern 312 and the second center region 324 except for the second through hole pattern 322, and between the first periphery region 316 and the second periphery region 326. According to an embodiment, the adhesive member 330 may be disposed between the first periphery region 316 and the second periphery region 326. According to an embodiment, the adhesive member 330 may be disposed between the first center region 314 and the first periphery region 316 of the first plate 310 and between the second center region 324 and the second periphery region 326 of the second plate 320. Sound or vibration may pass through the adhesive member 330 and be transmitted to the outside of the acoustic filter 300 and/or the electronic device (e.g., electronic device 200 of FIG. 2). According to an embodiment, the adhesive member 330 may be a double-sided adhesive tape or adhesive.

Figure 11:
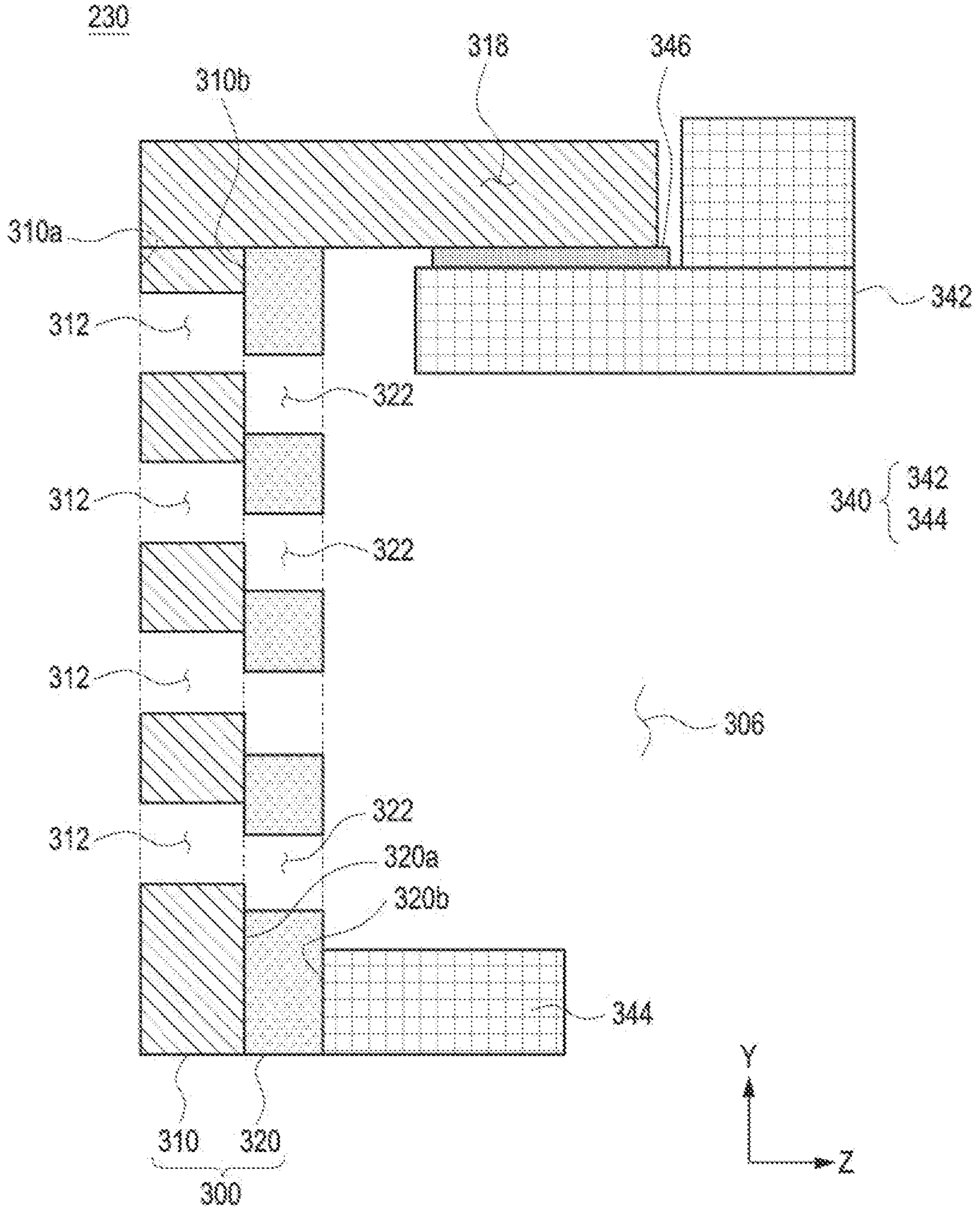
FIG. 11 is a cross-sectional view illustrating a speaker module including a speaker support member according to one or more embodiments of the disclosure.

FIG. 11 is a cross-sectional view illustrating a speaker module including a speaker support member according to one or more embodiments of the disclosure.

Referring to FIG. 11, the speaker module 230 may include a speaker support member 340 to connect the first plate 310 and the second plate 320 to each other. The configurations of the first plate 310 and the second plate 320 in FIG. 11 may be wholly or partially the same as those of the first plate 310 and the second plate 320 in FIG. 5. For example, the acoustic filter 300 may provide a path through which air is transmitted between the outside of the speaker module 230 and an inner space 306 of the speaker module 230. For example, air from the outside of the speaker module 230 may be transmitted to the inner space 306 of the speaker module 230 through the first through pattern 312 of the first plate 310 and the second through pattern 322 of the second plate 320. According to an embodiment, the acoustic filter 300 may include the first surface 310*a* (e.g., the first speaker module surface 230*a* of FIG. 5) of the first plate 310 facing the outside of the speaker module 230, and the fourth surface 320*b* facing the inner space 306 of the speaker module 230.

According to one or more embodiments, the speaker support member 340 may form at least a part of the exterior of the speaker module 230. For example, the speaker support member 340 may be interpreted as a part of a speaker frame that accommodates at least a part of a component (e.g., the diaphragm 232 and/or the coil 234 in FIG. 5) of the speaker module 230. According to an embodiment, the speaker support member 340 may include a first speaker support member 342 facing the first plate 310 and a second speaker support member 344 facing the second plate 320. According to an embodiment, the speaker support member 340 may be interpreted as a structure surrounding the inner space 306 between the acoustic filter 300 and the speaker module (e.g., the speaker module 230 of FIG. 4).

According to one or more embodiments, the first plate 310 may be connected to the speaker support member 340. For example, the first plate 310 may include a first protrusion region 318 extending from the first periphery region (e.g., the first periphery region 316 of FIG. 10A). The first protrusion region 318 may be connected to or coupled with the speaker support member 340. According to an embodiment, the first protrusion region 318 may face a part (e.g., side surface) of the second plate 320. According to an embodiment, the first protrusion region 318 may be connected to the speaker support member 340 by a fastening member 346. The fastening member 346 may be an adhesive tape or adhesive.

According to one or more embodiments, at least a part of the second plate 320 may be disposed between the first plate 310 and the speaker support member 340. According to an embodiment, the second plate 320 may be interference-fitted between the first plate 310 and the second speaker support member 344. For example, the third surface 320*a* of the second plate 320 may face the second surface 310*b* of the first plate 310, and the fourth surface 320*b* opposite to the third surface 320*a* may face the speaker support member 340.

Figure 12:
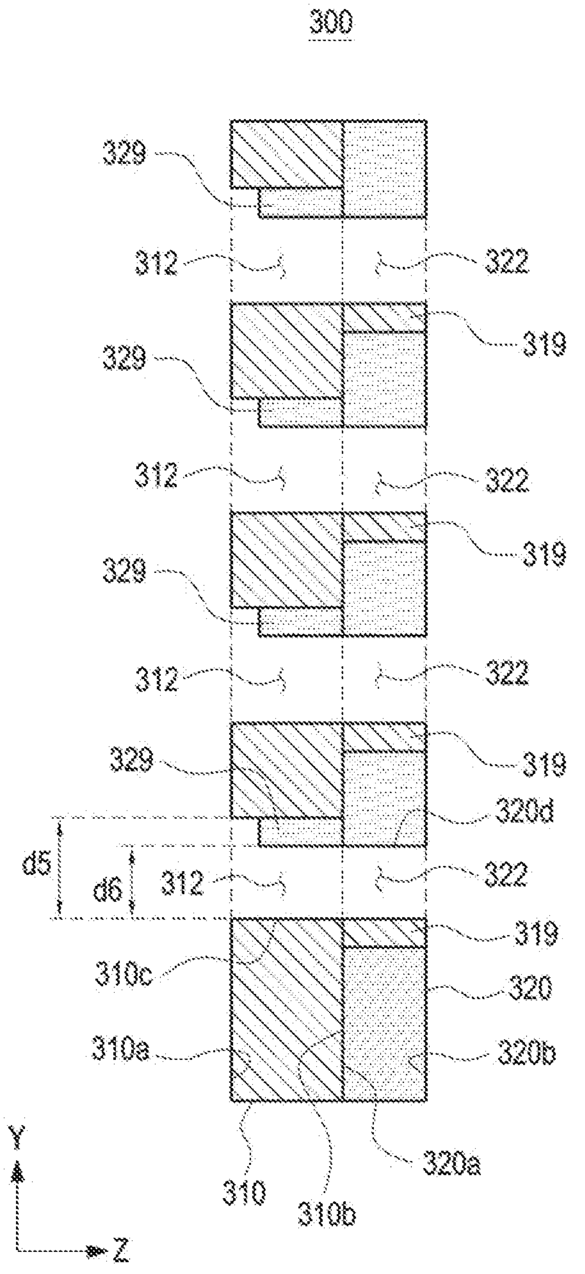
FIG. 12 is a cross-sectional view illustrating an acoustic filter according to an embodiment of the disclosure.

FIG. 12 is a cross-sectional view illustrating an acoustic filter according to an embodiment of the disclosure.

Referring to FIG. 12, the first plate 310 and the second plate 320 may be fastened to each other. For example, the first plate 310 and the second plate 320 may be interference-fitted. The configurations of the first plate 310 and the second plate 320 in FIG. 12 may be wholly or partially the same as those of the first plate 310 and the second plate 320 in FIG. 5.

According to one or more embodiments, the first plate 310 may be fitted into the second plate 320. According to an embodiment, the first plate 310 may include a first fastening region 319 extending from the second surface 310*b* facing the second plate 320, and the second plate 320 may include a second fastening region 329 extending from the third surface 320*a* facing the first plate 310. The first fastening region 319 may face the second inner surface 320*d* of the second plate 320 forming the second through pattern 322, and the second fastening region 329 may face the first inner surface 310*c* of the first plate 310 forming the first through pattern 312. According to an embodiment, the first fastening region 319 may contact the second inner surface 320*d*, and the second fastening region 329 may contact the first inner surface 310*c*. The first plate 310 and the second plate 320 may be coupled with each other using frictional force between the first fastening region 319 and the second inner surface 320*d* and/or frictional force between the second fastening region 329 and the first inner surface 310*c*.

According to one or more embodiments, the cross-sectional area or width of the first through pattern 312 may be reduced by the second fastening region 329. For example, the width (e.g., a fifth length d5) of the first through pattern 312 may be greater than or equal to the distance (e.g., a sixth length d6) between the second fastening region 329 and the first inner surface 310*c* of the first through pattern 312. According to an embodiment, the acoustic filter 300 may reduce or prevent migration of the sound absorbing material (e.g., the sound absorbing material 222 of FIG. 5). For example, the sixth length d6 may be smaller than the width (e.g., the second length d2 of FIG. 7D) of the sound absorbing material (e.g., the sound absorbing material 222 of FIG. 5).

According to one or more embodiments of the disclosure, an electronic device (e.g., the electronic device 200 of FIG. 2) may include a housing (e.g., the housing 210 of FIG. 2), a resonance space (e.g., the resonance space 220 of FIG. 4) located within the housing and accommodating a sound absorbing material, and a speaker module (e.g., the speaker module 230 of FIG. 6) located within the housing and including an acoustic filter (e.g., the acoustic filter 300 of FIG. 6) facing at least a part of the resonance space. The acoustic filter may include a first plate (e.g., the first plate 310 of FIG. 5) including a first through pattern (e.g., the first through pattern 312 of FIG. 5), and a second plate (e.g., the second plate 320 of FIG. 5) including a second through pattern (e.g., the second through pattern 322 of FIG. 5) facing a part of the first through pattern.

According to one or more embodiments, the first through pattern may be arranged with respect to at least one first axis (e.g., the first axis A1 of FIG. 8A), and the second through pattern may be arranged with respect to at least one second axis (e.g., the second axis A2 of FIG. 8) spaced apart from the at least one first axis.

According to one or more embodiments, when the acoustic filter is viewed from above, the acoustic filter may include an overlap region (e.g., the overlap region 302 of FIG. 7C) in which the first through pattern and the second through pattern overlap with each other, and a first cross-sectional area of the overlap region may be smaller than a second cross-sectional area of the first through pattern or a third cross-sectional area of the second through pattern.

According to one or more embodiments, a first length (e.g., the first length d1 of FIG. 7C) of the overlap region may be smaller than a second length (e.g., the second length d2 of FIG. 7D) of the sound absorbing material.

According to one or more embodiments, the acoustic filter may include an adhesive member (e.g., the adhesive member 330 of FIG. 10B) disposed between the first plate and the second plate.

According to one or more embodiments, the first plate may include a first center region (e.g., the first center region 314 of FIG. 10A) in which the first through pattern is located, and a first periphery region (e.g., the first periphery region 316 of FIG. 10A) surrounding the first center region, the second plate may include a second center region (e.g., the second center region 324 of FIG. 10A) in which the second through pattern is located, and a second periphery region surrounding the second center region, and the adhesive member may be disposed between the first periphery region and the second periphery region.

According to one or more embodiments, the speaker module may include a speaker support member (e.g., the speaker support member 342 of FIG. 11) supporting the first plate or the second plate.

According to one or more embodiments, the first plate may include a first protrusion region (e.g., the first protrusion region 318 of FIG. 11) facing the second plate and connected to the speaker support member, and at least a part of the second plate may be disposed between the first plate and the speaker support member.

According to one or more embodiments, the first plate may include a first surface (e.g., the first surface 310*a* of FIG. 8A) facing at least a part of the resonance space, and a second surface (e.g., the second surface 310*b* of FIG. 8A) opposite to the first surface, the first through pattern may be a plurality of through holes penetrating between the first surface and the second surface, the second plate may include a third surface (e.g., the third surface 320*a* of FIG. 8A) facing the first surface, and a fourth surface (e.g., the fourth surface 320*b* of FIG. 8A) opposite to the third surface, and the second through pattern may be a plurality of second through holes penetrating between the third surface and the fourth surface.

According to one or more embodiments, the speaker module may include a diaphragm (e.g., the diaphragm 232 of FIG. 5) and a coil (e.g., the coil 234 of FIG. 5) configured to vibrate the diaphragm.

According to one or more embodiments, the housing may include a speaker hole (e.g., the speaker hole 207 of FIG. 2) transmitting sound generated by the speaker module to an outside of the electronic device, and the speaker hole and the acoustic filter may be located in different directions relative to the diaphragm.

According to one or more embodiments, the first plate and the second plate may include at least one of aluminum, stainless steel, or copper.

According to one or more embodiments, the first through pattern and the second through pattern may be formed using press processing.

According to one or more embodiments, the sound absorbing material may include a plurality of particles into which a synthetic resin is solidified.

According to one or more embodiments of the disclosure, a speaker module (e.g., the speaker module 230 of FIG. 6) may include a diaphragm (e.g., the diaphragm 232 of FIG. 5), and an acoustic filter (e.g., the acoustic filter 300 of FIG. 5) which includes a first plate (e.g., the first plate 310 of FIG. 5) including a first through pattern (e.g., the first through pattern 312 of FIG. 5), and a second plate (e.g., the second plate 320 of FIG. 5) including a second through pattern (e.g., the second through pattern 322 of FIG. 5). The first through pattern may be arranged with respect to at least one first axis (e.g., the first axis A1 of FIG. 8A), and the second through pattern may be arranged with respect to at least one second axis (e.g., the second axis A2 of FIG. 8) spaced apart from the at least one first axis.

According to one or more embodiments, when the acoustic filter is viewed from above, the acoustic filter may include an overlap region (e.g., the overlap region 302 of FIG. 7C) in which the first through pattern and the second through pattern overlap with each other, and a sum of first cross-sectional areas of the overlap region may be smaller than a sum of second cross-sectional areas of the first through pattern or a third cross-sectional area of the second through pattern.

According to one or more embodiments, the acoustic filter may include an adhesive member (e.g., the adhesive member 330 of FIG. 10B) disposed between the first plate and the second plate, the first plate may include a first center region (e.g., the first center region 314 of FIG. 10A) in which the first through pattern is located, and a first periphery region (e.g., the first periphery region 316 of FIG. 10A) surrounding the first center region, the second plate may include a second center region (e.g., the second center region 324 of FIG. 10A) in which the second through pattern is located, and a second periphery region surrounding the second center region, and the adhesive member may be disposed between the first periphery region and the second periphery region.

According to one or more embodiments, the speaker module may further include a speaker support member (e.g., the speaker support member 342 of FIG. 11) supporting the first plate or the second plate, the first plate may include a first protrusion region (e.g., the first protrusion region 318 of FIG. 11) facing the second plate and connected to the speaker support member, and at least a part of the second plate may be disposed between the first plate and the speaker support member.

According to one or more embodiments, the first plate may include a first surface (e.g., the first surface 310*a* of FIG. 8A) facing at least a part of the resonance space, and a second surface (e.g., the second surface 310*b* of FIG. 8A) opposite to the first surface, the first through pattern may be a plurality of through holes penetrating between the first surface and the second surface, the second plate may include a third surface (e.g., the third surface 320*a* of FIG. 8A) facing the first surface, and a fourth surface (e.g., the fourth surface 320*b* of FIG. 8A) opposite to the third surface, and the second through pattern may be a plurality of second through holes penetrating between the third surface and the fourth surface.

The above-described electronic device including a speaker module according to the disclosure is not limited by the foregoing embodiments and drawings, and it will be apparent to those skilled in the art that many replacements, modifications, and variations can be made within the technical scope of the disclosure.

What is claimed is:

1. An electronic device comprising:
- a housing;
- a resonance space located inside the housing;
- a sound absorbing material disposed inside the resonance space; and
- a speaker module disposed inside the housing, the speaker module comprising a first speaker module surface facing the resonance space and an acoustic filter forming at least a part of the first speaker module surface, and
- wherein the acoustic filter comprises:
  - a first plate comprising a plurality of first through holes,
  - a second plate coupled to the first plate and comprising a plurality of second through holes, wherein the plurality of second through holes are misaligned with the plurality of first through holes such that each of the plurality of second through holes partially overlaps a corresponding one of the plurality of first through holes, and an overlap region formed by the plurality of first through holes and the plurality of second through holes partially overlapping with each other.

2. The electronic device of claim 1, wherein the plurality of first through holes are arranged with respect to at least one first axis, and wherein the plurality of second through holes are arranged with respect to at least one second axis spaced apart from the at least one first axis.

3. The electronic device of claim 1, wherein the acoustic filter further comprises an adhesive member disposed between the first plate and the second plate.

4. The electronic device of claim 3, wherein the first plate further comprises a first center region in which the plurality of first through holes are located, and a first periphery region surrounding the first center region, wherein the second plate further comprises a second center region in which the plurality of first through holes are located, and a second periphery region surrounding the second center region, and wherein the adhesive member is disposed between the first periphery region and the second periphery region.

5. The electronic device of claim 1, wherein the speaker module further comprises a speaker support member configured to support the first plate or the second plate.

6. The electronic device of claim 5, wherein the first plate further comprises a first protrusion region facing the second plate and connected to the speaker support member, and wherein at least a part of the second plate is disposed between the first plate and the speaker support member.

7. The electronic device of claim 1, wherein the first plate further comprises a first surface facing at least a part of the resonance space, and a second surface opposite to the first surface, wherein the plurality of first through holes penetrate the first surface and the second surface, wherein the second plate further comprises a third surface facing the first surface, and a fourth surface opposite to the third surface, and wherein the plurality of second through holes penetrate the third surface and the fourth surface.

8. The electronic device of claim 1, wherein the speaker module further comprises a diaphragm and a coil configured to vibrate the diaphragm.

9. The electronic device of claim 8, wherein the housing comprises a speaker hole configured to transmit sound generated by the speaker module to an outside of the electronic device, and wherein the speaker hole and the acoustic filter are located in different directions relative to the diaphragm.

10. The electronic device of claim 1, wherein the first plate and the second plate further comprise at least one of aluminum, stainless steel, and copper.

11. The electronic device of claim 1, wherein the plurality of first through holes are and the plurality of second through holes are formed using press processing.

12. The electronic device of claim 1, wherein the sound absorbing material comprises a plurality of particles solidified into a synthetic resin.

13. The electronic device of claim 1, wherein a shape of the plurality of first through holes are different from a shape of the plurality of second through holes.

14. An electronic device ocomprising:

a housing;

a resonance space located inside the housing;

a sound absorbing material disposed inside the resonance space; and a speaker module disposed inside the housing, the speaker module comprising an acoustic filter facing at least a portion of the resonance space, wherein the acoustic filter comprises:

a first plate comprising a first through pattern;

a second plate comprising a second through pattern facing a portion of the first through pattern; and an overlap region in which the first through pattern and the second through pattern overlap with each other, and wherein a first cross-sectional area of the overlap region is smaller than a second cross-sectional area of the first through pattern or a third cross-sectional area of the second through pattern.

15. The electronic device of claim 14, wherein a first length of the overlap region is smaller than a second length of the sound absorbing material.

16. An electronic device comprising:

a housing;

a resonance space located inside the housing;

a sound absorbing material disposed inside the resonance space; and a speaker module disposed inside the housing, the speaker module comprising an acoustic filter facing at least a portion of the resonance space, wherein the acoustic filter comprises:

a first plate comprising a first through pattern, a first center region in which the first through pattern is located, and a first periphery region surrounding the first center region;

a second plate comprising a second through pattern facing a portion of the first through pattern, a second center region in which the second through pattern is located, and a second periphery region surrounding the second center region and an adhesive member disposed between the first periphery region and the second periphery region.

* * * * *